United States Patent
Thornton et al.

(10) Patent No.: US 12,503,759 B2
(45) Date of Patent: Dec. 23, 2025

(54) CHEMICAL VAPOR INFILTRATION TOOLING HOLE MODIFICATION FOR OPTIMIZING INFILTRATION IN CERAMIC MATRIX COMPOSITES

(71) Applicant: Raytheon Technologies Corporation, Farmington, CT (US)

(72) Inventors: Lane M. Thornton, Tolland, CT (US); Brendan Lenz, Wethersfield, CT (US); Mary Colby, West Hartford, CT (US); Andrew Joseph Lazur, La Jolla, CA (US); Daniel P. Preuss, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 367 days.

(21) Appl. No.: 18/118,450

(22) Filed: Mar. 7, 2023

(65) Prior Publication Data

US 2024/0301547 A1    Sep. 12, 2024

(51) Int. Cl.
*C23C 16/04* (2006.01)

(52) U.S. Cl.
CPC ................... *C23C 16/045* (2013.01)

(58) Field of Classification Search
CPC ........ C23C 16/45565; C23C 16/45563; C23C 16/045
See application file for complete search history.

(56) References Cited

U.S. PATENT DOCUMENTS

| | | |
|---|---|---|
| 3,991,248 A | 11/1976 | Bauer |
| 4,909,914 A | 3/1990 | Chiba et al. |
| 5,217,755 A | 6/1993 | Thebault et al. |
| 8,845,806 B2 | 9/2014 | Aida et al. |
| 10,906,205 B2 | 2/2021 | Thibaud et al. |
| 10,906,842 B2 | 2/2021 | Shi et al. |
| 11,046,620 B2 | 6/2021 | Shim et al. |
| 11,332,827 B2 | 5/2022 | Agarwal et al. |

(Continued)

FOREIGN PATENT DOCUMENTS

| | | |
|---|---|---|
| CN | 107266099 A | 10/2017 |
| CN | 115181959 A | 10/2022 |

(Continued)

OTHER PUBLICATIONS

Partial Search Report for EP Application No. 24161857.8, dated Jul. 17, 2024, 11 pages.

(Continued)

*Primary Examiner* — Joseph A Miller, Jr.
(74) *Attorney, Agent, or Firm* — Kinney & Lange, P.A.

(57) ABSTRACT

A tooling fixture suitable for use in infiltrating a fibrous preform with a reactant gas includes an outer surface and opposing inner surface defining a thickness therebetween, and a plurality of holes extending through the thickness. Each hole of the plurality of holes includes an inlet at the outer surface, the inlet configured to receive a flow of the reactant gas, an outlet at the inner surface, a transition point between the inlet and the outlet, and an angled segment extending from the transition point to the outlet. Each hole of the plurality of holes has a first diameter at the inlet and a second diameter at the outlet, and the second diameter is greater than the first diameter.

17 Claims, 4 Drawing Sheets

(56) References Cited

U.S. PATENT DOCUMENTS

| | | | |
|---|---|---|---|
| 2001/0050059 A1* | 12/2001 | Hongo | H01J 37/32192 |
| | | | 118/723 MW |
| 2007/0079934 A1 | 4/2007 | Murata et al. | |
| 2012/0097330 A1 | 4/2012 | Iyengar et al. | |
| 2012/0103264 A1* | 5/2012 | Choi | C23C 16/45565 |
| | | | 118/728 |
| 2015/0214009 A1 | 7/2015 | Glukhoy | |
| 2017/0114462 A1 | 4/2017 | Zhang et al. | |
| 2018/0340257 A1 | 11/2018 | Achary et al. | |
| 2020/0061868 A1 | 2/2020 | Thibaud et al. | |
| 2020/0123066 A1 | 4/2020 | Shi et al. | |
| 2020/0123067 A1 | 4/2020 | Freeman et al. | |
| 2020/0308703 A1 | 10/2020 | Agarwal et al. | |
| 2022/0195606 A1 | 6/2022 | Borkowski et al. | |
| 2023/0047104 A1 | 2/2023 | Parzefall | |

FOREIGN PATENT DOCUMENTS

| | | |
|---|---|---|
| EP | 3805424 A1 | 4/2021 |
| JP | S58176196 A | 10/1983 |
| JP | 5093165 B2 | 9/2012 |
| JP | 7164632 B2 | 10/2022 |

OTHER PUBLICATIONS

Extended European Search Report for EP Application No. 24161857.8, dated Dec. 19, 2024, 13 pages.
Extended European Search Report for EP Application No. 24161794.3, dated Oct. 11, 2024, 15 pages.
Extended European Search Report for EP Application No. 24161861.0, dated Oct. 23, 2024, 15 pages.

* cited by examiner

CHEMICAL VAPOR INFILTRATION TOOLING HOLE MODIFICATION FOR OPTIMIZING INFILTRATION IN CERAMIC MATRIX COMPOSITES

BACKGROUND

The present invention relates to chemical vapor infiltration (CVI), and more particularly to improved tooling for CVI.

Ceramic matrix composite (CMC) parts are widely fabricated by applying an interface coating (IFC) to preforms made from woven fabrics or oriented/braided fiber tows. To keep the preforms in a rigid form and maintain proper shape and geometry, perforated tooling can be used to hold the preforms during the initial densification cycle(s). Holes in the tooling allow vaporous precursors to infiltrate into the preform for the deposition of a ceramic matrix. Tooling for simple preform shapes can be designed with uniform hole dimensions. When used with complexly-shaped preforms such as turbine airfoils, vaporous precursors may not sufficiently infiltrate the preform at certain locations through such holes. The result can be undesirable variation in deposition rate and effective IFC thickness, which can drive differences in mechanical behavior and durability of the CMC part. Thus, a need exists for improved tooling.

SUMMARY

A tooling fixture suitable for use in infiltrating a fibrous preform with a reactant gas includes an outer surface and opposing inner surface defining a thickness therebetween, and a plurality of holes extending through the thickness. Each hole of the plurality of holes includes an inlet at the outer surface, the inlet configured to receive a flow of the reactant gas, an outlet at the inner surface, a transition point between the inlet and the outlet, and an angled segment extending from the transition point to the outlet. Each hole of the plurality of holes has a first diameter at the inlet and a second diameter at the outlet, and the second diameter is greater than the first diameter.

A tooling fixture suitable for use in infiltrating a fibrous preform with a reactant gas includes an outer surface and opposing inner surface defining a thickness therebetween, and a plurality of holes extending through the thickness. Each hole of the plurality of holes includes an inlet at the outer surface, the inlet configured to receive a flow of the reactant gas, an outlet at the inner surface, a transition point between the inlet and the outlet, and at least one branching hole extending away from the hole between the transition point and the outer surface.

A tooling fixture suitable for use in infiltrating a fibrous preform with a reactant gas includes an outer surface and opposing inner surface defining a thickness therebetween, and a plurality of holes extending through the thickness. Each hole of the plurality of holes includes an inlet at the outer surface, and an outlet at the inner surface. The tooling fixture further includes a first hole concentration at the outer surface, the first hole concentration being defined by an inlet diameter of each hole of the plurality of holes, and a second hole concentration at the inner surface, the second hole concentration defined by an outlet diameter of each hole of the plurality of holes. The second hole concentration is greater than the first hole concentration.

Figure 1A:
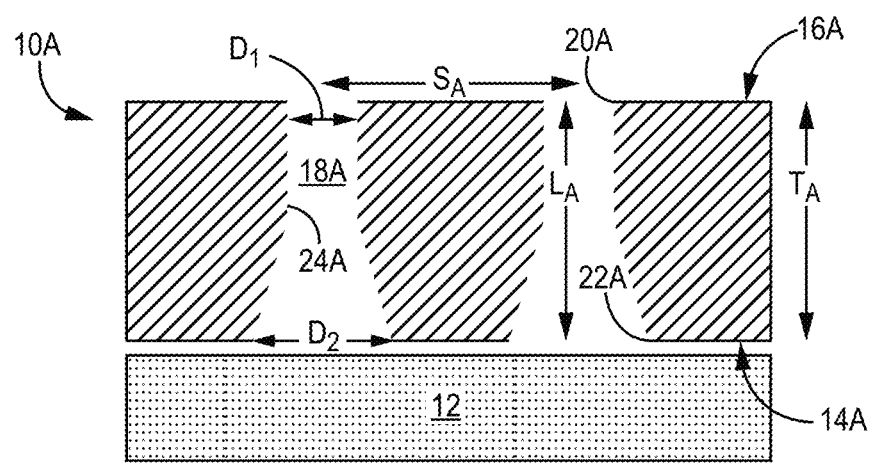
FIG. 1A is a simplified cross-sectional illustration of a tooling fixture with infiltration holes according to a first embodiment.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various expanding-diameter infiltration holes for a tooling fixture. The conical, directional, and branching configurations discussed herein allow for an increase in hole concentration on the inner, preform-facing surface of the tooling fixture to facilitate a more even and/or tailored deposition of reactant gases on the enclosed preform.

Figure 1B:
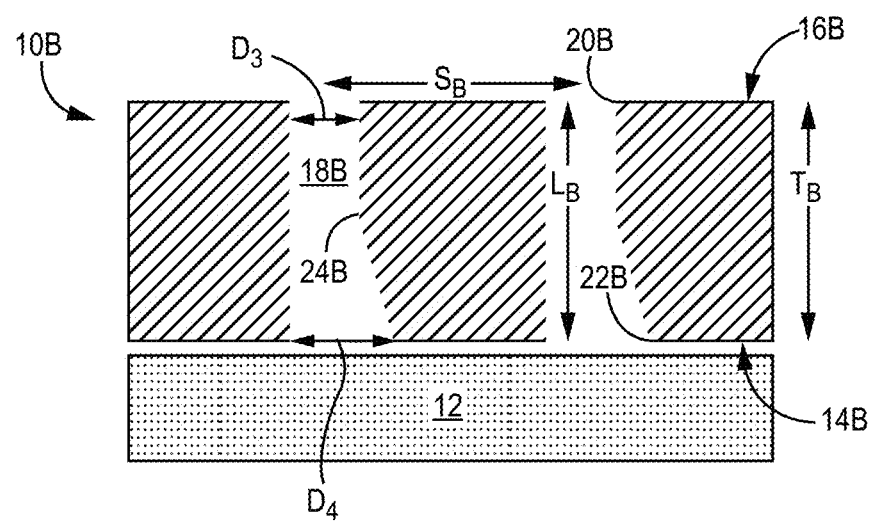
FIG. 1B is a simplified cross-sectional illustration of a tooling fixture with infiltration holes according to a second embodiment.
Figure 1C:
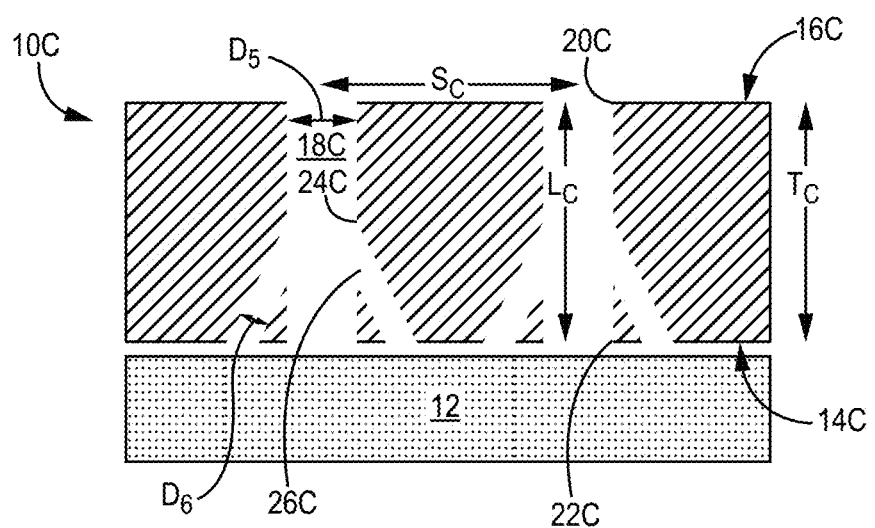
FIG. 1C is a simplified cross-sectional illustration of a tooling fixture with infiltration holes according to a third embodiment.

FIGS. 1A, 1B, and 1C are simplified, enlarged cross-sectional illustrations of alternative infiltration holes 18A, 18B, and 18C, respectively, for a tooling fixture. FIGS. 1A, 1B, and 1C are discussed together.

FIG. 1A illustrates a portion/side of tooling fixture 10A and enclosed preform 12. Tooling fixture 10A can, in an exemplary embodiment, be formed from graphite. In an alternative embodiment, tooling fixture 10A can be entirely or partially formed from refractory metal alloys, carbon-carbon composites, and/or a ceramic (e.g., silicon carbide, aluminum oxide, boron nitride, etc.). Preform 12 can be formed from tows of silicon carbide (SiC) or other ceramic fibers arranged in one of various two or three-dimensional woven architectures such as plain, harness (e.g., 3, 5, 8, etc.), twill, braid, or non-symmetric, to name a few non-limiting examples. In an alternative embodiment, preform 12 can be formed from non-woven (e.g., chopped, felted, etc.) fibers. Tooling fixture 10A can at least partially surround preform 12 to help maintain the shape of preform 12 during CVI. Tooling fixture 10A and preform 12 can each include straight and/or curved segments depending on the geometry desired in the final CMC part.

Tooling fixture 10A includes inner (preform-facing) surface 14A, oppositely disposed outer surface 16A, and thickness $T_A$ extending therebetween. Thickness $T_A$ need not be uniform across the entirety of tooling fixture 10A, although FIG. 1A depicts a section of uniform thickness. Tooling fixture 10A further includes holes 18A, each with a length $L_A$ extending completely through thickness $T_A$ such that $L_A = T_A$. Each hole 18A includes inlet 20A at outer surface 16A and outlet 22A at inner surface 14A. Reactant gas travels through tooling fixture 10A in the direction in an inlet-to-outlet direction during CVI. Each hole 18A has a cylindrical three-dimensional geometry forming a rectangular cross-sectional area (in the cross-sectional plane shown in FIG. 1A), beginning at inlet 20A and extending inward toward outlet 22A, and transitions to a frustoconical three-dimensional geometry forming a trapezoidal cross-sectional area at transition point 24A. Accordingly, each hole 18A has a uniform first diameter D1 between inlet 20A and transition point 24A, and a second diameter D2 measured at outlet 22A. The diameter linearly increases between transition point 24A and outlet 22A such that D1<D2, and D2 is also the maximum diameter along length $L_A$ of hole 18A. In one embodiment, D1 can be 0.125 in (3.175 mm) and D2 can range from 0.131 in to 0.25 in (3.33 mm to 6.35 mm). To put it another way, D2 can generally be 1.05 times to 2.0 times greater than D1. Hole diameters (e.g., D1 and D2) can be optimized to improve while balancing the effects of "pillowing" (the elastic expansion of preform 12 material into a hole). Holes 18A can be referred to as "conical outlet holes." Each hole 18A can be spaced apart from an adjacent hole 18A a distance SA, as measured from hole midpoint to midpoint.

FIG. 1B illustrates alternative tooling fixture 10B supporting preform 12. Tooling fixture 10B is substantially similar to tooling fixture 10A having a thickness $T_B$ defined by inner and outer surfaces 14B and 16B, respectively. Tooling fixture 10B further includes holes 18B, each with a length $L_B$ extending completely through thickness $T_B$ between inlet 20B to outlet 22B. As shown, $L_B=T_B$. Each hole 18B similarly has a cylindrical three-dimensional geometry (and rectangular cross-sectional area), beginning at inlet 20B and extending inward toward outlet 22B, but transitions to a partially frustoconical three-dimensional geometry (and partial trapezoidal area) at transition point 24B. As such, each hole 18B is asymmetrical between transition point 24B and outlet 22B, with one straight wall segment and one angled wall segment. Holes 18B can be referred to as "directional outlet holes." Each hole 18B has a uniform first diameter D3 between inlet 22B and transition point 24B, and a second diameter D4 at outlet 22A. The diameter linearly increases over a portion of hole 18B between transition point 24B and outlet 22B such that D3<D4, and D4 is also the maximum diameter along length $L_B$ of hole 18B. In one embodiment, D3 can be 0.125 in and D4 can range from 0.131 in to 0.25 in. Each hole 18B can be spaced apart from an adjacent hole 18B a distance SB, as measured from hole midpoint to midpoint.

FIG. 1C illustrates alternative tooling fixture 10C supporting preform 12. Tooling fixture 10Cs is substantially similar to tooling fixtures 10A and 10B having a thickness $T_C$ defined by inner and outer surfaces 14C and 16C, respectively. Tooling fixture 10C further includes holes 18C, each with a length $L_C$ extending completely through thickness $T_C$ between inlet 20C to outlet 22C. As shown, $L_C=T_C$. Unlike holes 18A and 18B, each hole 18C has a cylindrical three-dimensional geometry between inlet 20C and outlet 22C with a uniform first diameter D5. In one embodiment, D5 can be 0.125 in. However, each hole 18C includes one or more branching holes 26C branching off a respective hole 18C at transition point 24C. Each branching hole 26C can also be cylindrical with a uniform second diameter D6. As shown, D5>D6, but in an alternative embodiment, D5=D6. Branching holes 26C extend from transition point 24C to inner surface 14C to fluidly connect a respective hole 18C to the space between inner surface 14C and preform 12. Holes 18C can include additional branching holes 26C, for example with an additional transition point 24C closer to inlet 20C. Each hole 18C can be spaced apart from an adjacent hole 18C a distance $S_C$, as measured from hole midpoint to midpoint.

Holes 18A, 18B, and 18C allow for reactant gases to be spread across a larger area of preform 12, by widening (i.e., increasing hole diameter) and/or otherwise increasing the total hole (i.e., open area) concentration on the inner surface of the respective tooling fixture relative to the outer surface. This can allow for a more uniform IFC deposition on preform 12 by more evenly spreading the reactant gas using the modified outlet geometries of holes 18A, 18B, and 18C, compared to cylindrical holes alone. Holes 18B can be used to supply a more targeted, directional flow of reactant gas on preform 12 based on the direction of the angled wall segment. Similarly, an alternative embodiment of hole 18C can include a single branching hole 26C to achieve a directional flow. Any of holes 18A, 18B, and/or 18C can be included in a single tooling fixture and/or combined with cylindrical holes depending on, for example, preform geometry, thickness, etc. Holes 18A, 18B, and 18C can be formed using a laser or mechanical drilling technique, including countersinking for holes 18A.

Figure 2:
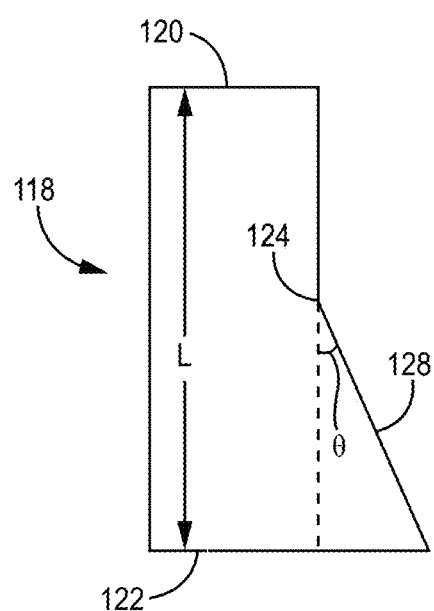
FIG. 2 is a simplified cross-sectional illustration showing a diffusion angle of an infiltration hole.

FIG. 2 is a simplified cross-sectional illustration of one embodiment of hole 118, shown in isolation from a tooling fixture. Hole 118 can, for example, be a directional cooling hole (i.e., 18B), but can also be applied to hole 18A. Hole 118 includes inlet 120, outlet 122, and length L measured between inlet 120 and outlet 122. Transition point 124 is positioned somewhere along length L. In an exemplary embodiment, transition point 124 can be positioned at about 75% length L, with respect to a starting point at inlet 120, such that transition point 124 is relatively closer to outlet 122. Angled segment (i.e., hypotenuse) 128 extends from transition point 124 and extends to outlet 122. Angled segment 128 creates diffusion angle θ at transition point 124 which can range from 0° to 30°, more narrowly from 5° to 20°, or even more narrowly from 7° to 10°. Such ranges allow for a desirable increase in hole diameter at outlet 122 while minimizing the separation of reactant gas flow from the internal surface of hole 118. Holes 18A and 18B can include substantially similar transition points and diffusion angles.

With respect to the embodiment of FIG. 1C, branching holes 26C may be disposed relative to a respective hole 18C at an angle falling within the ranges listed above, but the angle can be greater than 30° in some embodiments.

The disclosed tooling fixtures can be used to form CMC components for aerospace, maritime, or industrial equipment, to name a few, non-limiting examples.

DISCUSSION OF POSSIBLE EMBODIMENTS

The following are non-exclusive descriptions of possible embodiments of the present invention.

A tooling fixture suitable for use in infiltrating a fibrous preform with a reactant gas includes an outer surface and opposing inner surface defining a thickness therebetween, and a plurality of holes extending through the thickness. Each hole of the plurality of holes includes an inlet at the outer surface, the inlet configured to receive a flow of the reactant gas, an outlet at the inner surface, a transition point between the inlet and the outlet, and an angled segment extending from the transition point to the outlet. Each hole of the plurality of holes has a first diameter at the inlet and a second diameter at the outlet, and the second diameter is greater than the first diameter.

The tooling fixture of the preceding paragraph can optionally include, additionally and/or alternatively, any one or more of the following features, configurations and/or additional components:

In the above tooling fixture, the first diameter can be 0.125 in.

In any of the above tooling fixtures, each hole of the plurality of holes can be cylindrical between the inlet and the transition point.

In any of the above tooling fixtures, each hole of the plurality of holes can be at least partially frustoconical between the transition point and the outlet.

In any of the above tooling fixtures, the angled segment can define a diffusion angle at the transition point, and the diffusion angle can range from 5° to 20°.

In any of the above tooling fixtures, the tooling fixture can be formed from at least one of graphite, a refractory metal alloy, a carbon-carbon composite, and a ceramic material.

A tooling fixture suitable for use in infiltrating a fibrous preform with a reactant gas includes an outer surface and opposing inner surface defining a thickness therebetween, and a plurality of holes extending through the thickness. Each hole of the plurality of holes includes an inlet at the outer surface, the inlet configured to receive a flow of the reactant gas, an outlet at the inner surface, a transition point between the inlet and the outlet, and at least one branching hole extending away from the hole between the transition point and the outer surface.

The tooling fixture of the preceding paragraph can optionally include, additionally and/or alternatively, any one or more of the following features, configurations and/or additional components:

In the above tooling fixture, each hole of the plurality of holes can be cylindrical between the inlet and the outlet with a uniform first diameter.

In any of the above tooling fixtures, the at least one branching hole can be cylindrical with a uniform second diameter.

In any of the above tooling fixtures, the first diameter can be greater than the second diameter.

In any of the above tooling fixtures, the at least one branching hole can include a plurality of branching holes.

In any of the above tooling fixtures, the tooling fixture can be formed from at least one of graphite, a refractory metal alloy, a carbon-carbon composite, and a ceramic material.

A tooling fixture suitable for use in infiltrating a fibrous preform with a reactant gas includes an outer surface and opposing inner surface defining a thickness therebetween, and a plurality of holes extending through the thickness. Each hole of the plurality of holes includes an inlet at the outer surface, and an outlet at the inner surface. The tooling fixture further includes a first hole concentration at the outer surface, the first hole concentration being defined by an inlet diameter of each hole of the plurality of holes, and a second hole concentration at the inner surface, the second hole concentration defined by an outlet diameter of each hole of the plurality of holes. The second hole concentration is greater than the first hole concentration.

The tooling fixture of the preceding paragraph can optionally include, additionally and/or alternatively, any one or more of the following features, configurations and/or additional components:

In the above tooling fixture, each hole of the plurality of holes can further include a transition point between the inlet and the outlet, and an angled segment extending from the transition point to the outlet.

In any of the above tooling fixtures, each hole of the plurality of holes can be cylindrical between the inlet and the transition point.

In any of the above tooling fixtures, each hole of the plurality of holes can be at least partially frustoconical between the transition point and the outlet.

In any of the above tooling fixtures, each hole of the plurality of holes can be cylindrical between the inlet and the outlet.

In any of the above tooling fixtures, each hole of the plurality of holes can include at least one branching hole extending away from the hole between the transition point and the outer surface, and the at least one branching hole can define the angled segment.

In any of the above tooling fixtures, the angled segment can define a diffusion angle at the transition point, the diffusion angle can range from 5° to 20°.

In any of the above tooling fixtures, the tooling fixture can be formed from at least one of graphite, a refractory metal alloy, a carbon-carbon composite, and a ceramic material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A tooling fixture suitable for use in infiltrating a fibrous preform with a reactant gas, the tooling fixture configured to at least partially surround the fibrous preform and comprising:
    an outer surface and opposing preform-facing inner surface defining a thickness therebetween, the preform-facing inner surface having a geometry to maintain a shape of the preform; and
    a plurality of holes extending through the thickness, each hole of the plurality of holes comprising:
        an inlet at the outer surface, the inlet configured to receive a flow of the reactant gas;
        an outlet at the inner surface;
        a transition point between the inlet and the outlet; and
        an angled segment extending from the transition point to the outlet;
    wherein each hole of the plurality of holes has a first diameter at the inlet and a second diameter at the outlet; and
    wherein the second diameter is greater than the first diameter.

2. The tooling fixture of claim 1, wherein the first diameter is 0.125 in.

3. The tooling fixture of claim 1, wherein each hole of the plurality of holes is cylindrical between the inlet and the transition point.

4. The tooling fixture of claim 3, wherein each hole of the plurality of holes is at least partially frustoconical between the transition point and the outlet.

5. The tooling fixture of claim 1, wherein the angled segment defines a diffusion angle at the transition point, and wherein the diffusion angle ranges from 5° to 20°.

6. The tooling fixture of claim 1, wherein the tooling fixture is formed from at least one of graphite, a refractory metal alloy, a carbon-carbon composite, and a ceramic material.

7. A tooling fixture suitable for use in infiltrating a fibrous preform with a reactant gas, the tooling fixture comprising:
    an outer surface and opposing inner surface defining a thickness therebetween; and a plurality of holes extending through the thickness, each hole of the plurality of holes comprising:
an inlet at the outer surface, the inlet configured to receive a flow of the reactant gas;
an outlet at the inner surface, wherein each hole of the plurality of holes is cylindrical between the inlet and the outlet with a uniform first diameter;
a transition point between the inlet and the outlet; and
at least one branching hole extending away from the hole between the transition point and the outer surface.

8. The tooling fixture of claim 7, wherein the at least one branching hole is cylindrical with a uniform second diameter.

9. The tooling fixture of claim 8, wherein the first diameter is greater than the second diameter.

10. The tooling fixture of claim 7, wherein the at least one branching hole comprises a plurality of branching holes.

11. The tooling fixture of claim 7, wherein the tooling fixture is formed from at least one of graphite, a refractory metal alloy, a carbon-carbon composite, and a ceramic material.

12. A tooling fixture suitable for use in infiltrating a fibrous preform with a reactant gas, the tooling fixture comprising:
an outer surface and opposing inner surface defining a thickness therebetween; and
a plurality of holes extending through the thickness; each hole of the plurality of holes comprising:
an inlet at the outer surface; and
an outlet at the inner surface;
a first hole concentration at the outer surface, the first hole concentration being defined by an inlet diameter of each hole of the plurality of holes; and
a second hole concentration at the inner surface, the second hole concentration defined by an outlet diameter of each hole of the plurality of holes;
wherein the second hole concentration is greater than the first hole concentration;
wherein each hole of the plurality of holes is cylindrical between the inlet and the outlet,
and further wherein each hole of the plurality of holes comprises:
a transition point between the inlet and the outlet; and
an angled segment extending from the transition point to the outlet.

13. The tooling fixture of claim 12, wherein each hole of the plurality of holes is cylindrical between the inlet and the transition point.

14. The tooling fixture of claim 13, wherein each hole of the plurality of holes is at least partially frustoconical between the transition point and the outlet.

15. The tooling fixture of claim 12, wherein each hole of the plurality of holes comprises:
at least one branching hole extending away from the hole between the transition point and the outer surface;
wherein the at least one branching defines the angled segment.

16. The tooling fixture of claim 12, wherein the angled segment defines a diffusion angle at the transition point, and wherein the diffusion angle ranges from 5° to 20°.

17. The tooling fixture of claim 12, wherein the tooling fixture is formed from at least one of graphite, a refractory metal alloy, a carbon-carbon composite, and a ceramic material.

* * * * *